(12) United States Patent
Shin

(10) Patent No.: US 8,175,652 B2
(45) Date of Patent: May 8, 2012

(54) TERMINAL AND METHOD OF CONTROLLING THE SAME

(75) Inventor: Dong Kil Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 618 days.

(21) Appl. No.: 12/252,049

(22) Filed: Oct. 15, 2008

(65) Prior Publication Data

US 2009/0197647 A1     Aug. 6, 2009

(30) Foreign Application Priority Data

Feb. 5, 2008   (KR) ........................ 10-2008-0011714

(51) Int. Cl.
*H04M 1/00*   (2006.01)

(52) U.S. Cl. ..... 455/566; 455/564; 455/567; 455/158.4; 455/158.5

(58) Field of Classification Search .................. 455/566; 345/173

See application file for complete search history.

(56) References Cited

U.S. PATENT DOCUMENTS

| | | | |
|---|---|---|---|
| 5,638,438 A | 6/1997 | Keen | |
| 2001/0002926 A1* | 6/2001 | Moon | 379/93.17 |
| 2005/0197163 A1* | 9/2005 | Lee et al. | 455/564 |
| 2005/0289480 A1 | 12/2005 | Mathews et al. | |
| 2007/0082708 A1 | 4/2007 | Griffin | |
| 2007/0273668 A1* | 11/2007 | Park et al. | 345/173 |
| 2008/0079609 A1* | 4/2008 | Kallqvist | 341/22 |
| 2008/0204423 A1* | 8/2008 | Kim | 345/173 |
| 2009/0019398 A1* | 1/2009 | Hansson et al. | 715/838 |

FOREIGN PATENT DOCUMENTS

| | | |
|---|---|---|
| CN | 1937647 A | 3/2007 |
| EP | 0664504 A2 | 7/1995 |
| GB | 2446651 A | 8/2008 |
| KR | 10-2000-0034283 | 6/2000 |
| KR | 10-2005-0051463 A | 6/2005 |
| KR | 10-2006-0031472 | 4/2006 |
| KR | 10-2007-0015338 A | 2/2007 |

* cited by examiner

*Primary Examiner* — David Q Nguyen
(74) *Attorney, Agent, or Firm* — Birch, Stewart, Kolasch & Birch, LLP

(57) ABSTRACT

A mobile terminal having a display including a touch screen, and a control unit configured to display on the touch screen a plurality of key buttons, and when a first key button of the plurality of key buttons is touched, to display at least one item that is relevant to the first touched key button in an area of the touch screen defined by the key buttons.

23 Claims, 11 Drawing Sheets

TERMINAL AND METHOD OF CONTROLLING THE SAME

This application claims the benefit of the Korean Patent Application No. 10-2008-0011714, filed on Feb. 5, 2008, which is hereby incorporated by reference as if fully set forth herein.

BACKGROUND OF THE INVENTION

1. Field of the Invention

The present invention relates to a terminal and corresponding method for displaying display information that is relevant to touched key buttons in an area of the touch screen defined by the key buttons.

2. Discussion of the Related Art

Mobile terminals now provide many additional services beside the basic call service. For example. User can now access the Internet, play games, watch videos, listen to music, capture images and videos, record audio files, etc. Mobile terminals now provide broadcasting programs such that user can watch television shows, sporting programs, videos etc.

To handle the increase in functions provided with mobile terminals, the mobile terminals now include sophisticated graphical user Interfaces. That is, the user interfaces are created to make it easier for a user to navigate through the various functions provided with the terminal. However, the graphical user interfaces include menu options that are set in a hierarchical fashion such that a user must select a first main menu and then select one or more sub-menus to execute a particular function.

SUMMARY OF THE INVENTION

Accordingly, one object of the present invention is to address the above-noted and other problems.

Another object of the present invention is to that make is easier for a user to search various and numerous items stored in the terminal for a specific item and by which a corresponding function can be executed.

To achieve these objects and other advantages and in accordance with the purpose of the invention, as embodied and broadly described herein, the present invention provides in one aspect a mobile terminal having a display including a touch screen, and a control unit configured to display on the touch screen a plurality of key buttons, and when a first key button of the plurality of key buttons is touched, to display at least one item that is relevant to the first touched key button in an area of the touch screen defined by the key buttons. The present invention also provides a corresponding method of controlling a mobile terminal.

In another aspect, the present invention provides a mobile terminal having a display unit including a touch screen, and a control unit configured to display a plurality of virtual key buttons when a prescribed function is selected, and to display items relevant to the prescribed function in an area of the touch screen defined by the key buttons. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
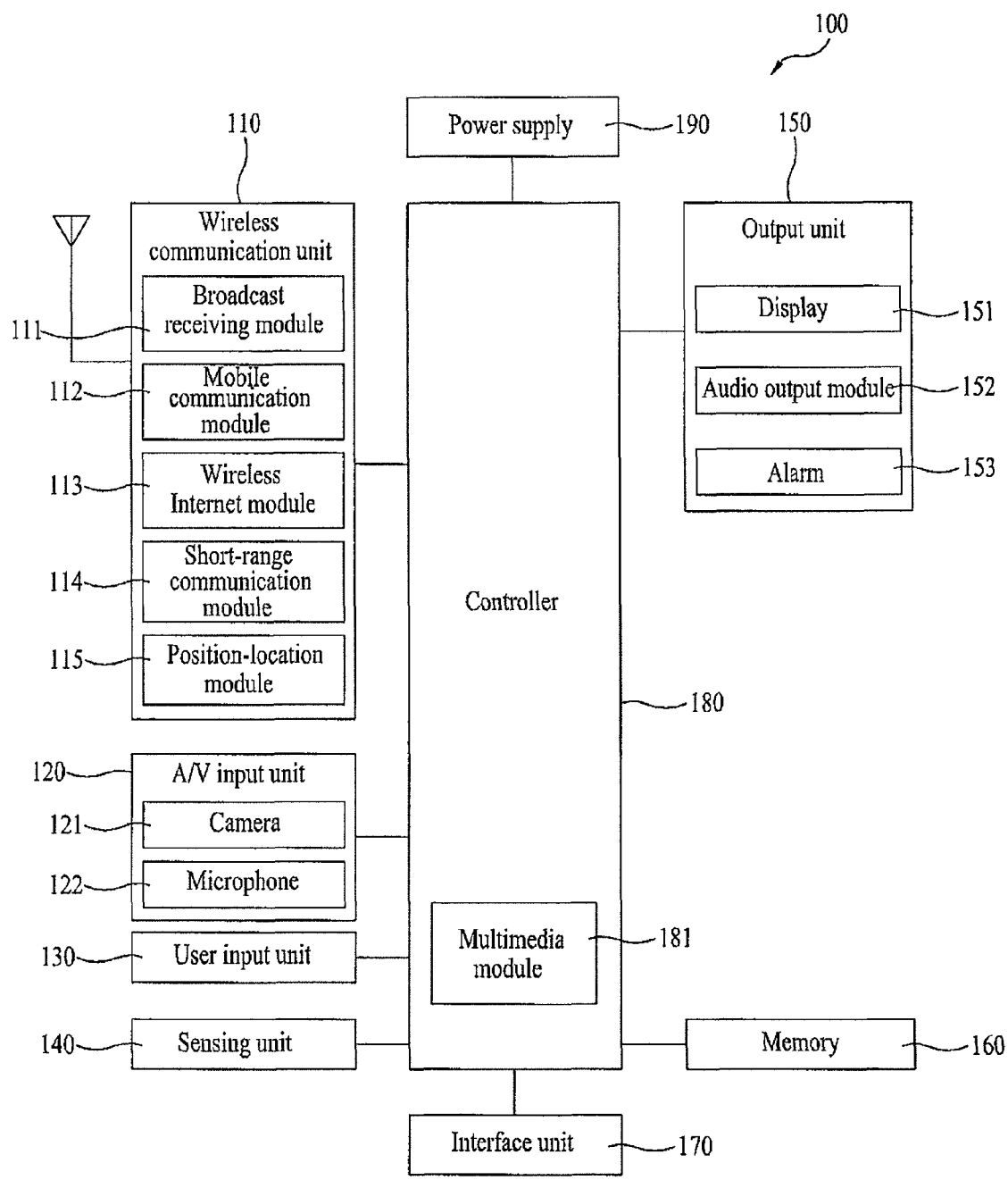
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located. For non-mobile terminals, the wireless communication unit 110 can be replaced with a wire communication unit. The wireless communication unit 110 and the wire communication unit can be referred to as a communication unit.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless internet module can also be replaced with a wire Internet module in non-mobile terminals. The wireless internet module 113 and wire internet module may be commonly referred to as an internet module.

The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is commonly used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

The memory 160 is able to store items according to various functions within the terminal. Further, the items are sorted and stored in order of frequency in use, recent use, recent storage or the like. How to search and execute the items in association with the present invention will be explained later in this disclosure.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
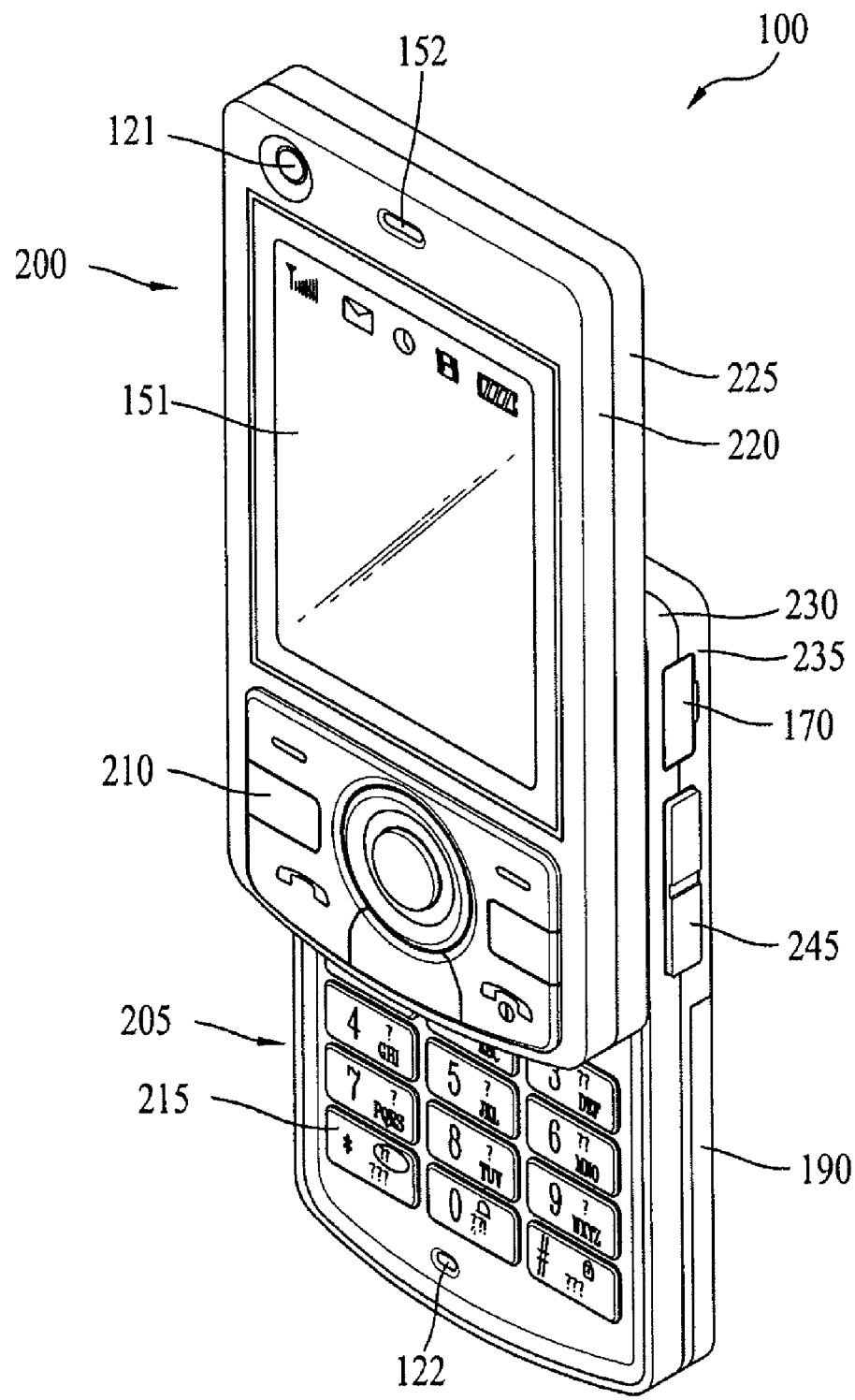
FIG. 2 is a front side view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. Although not shown in the drawings, for a folder-type mobile terminal, a first body thereof folds and unfolds relative to a second body thereof between open and closed positions. In addition, for a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
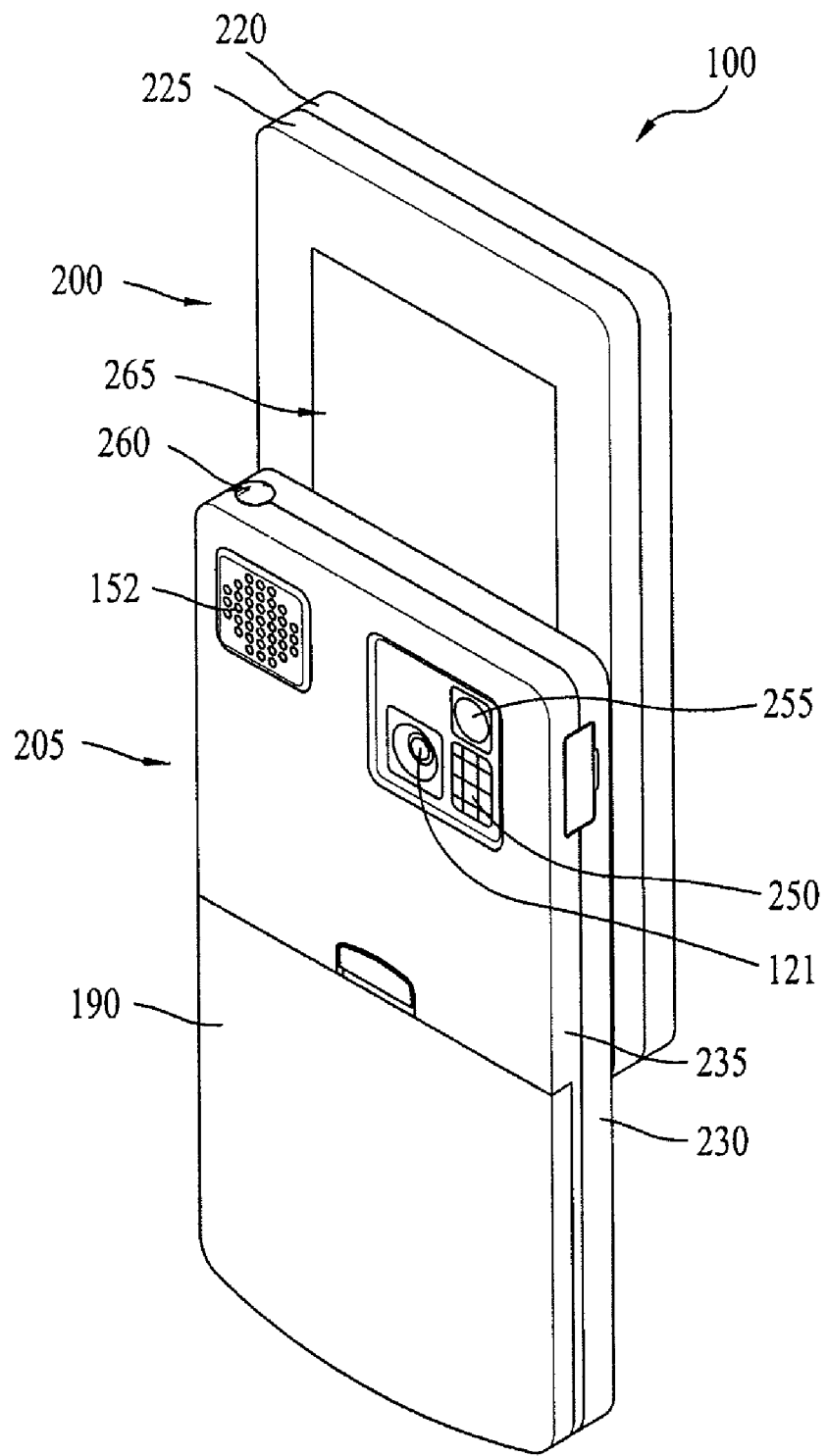
FIG. 3 is a backside view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
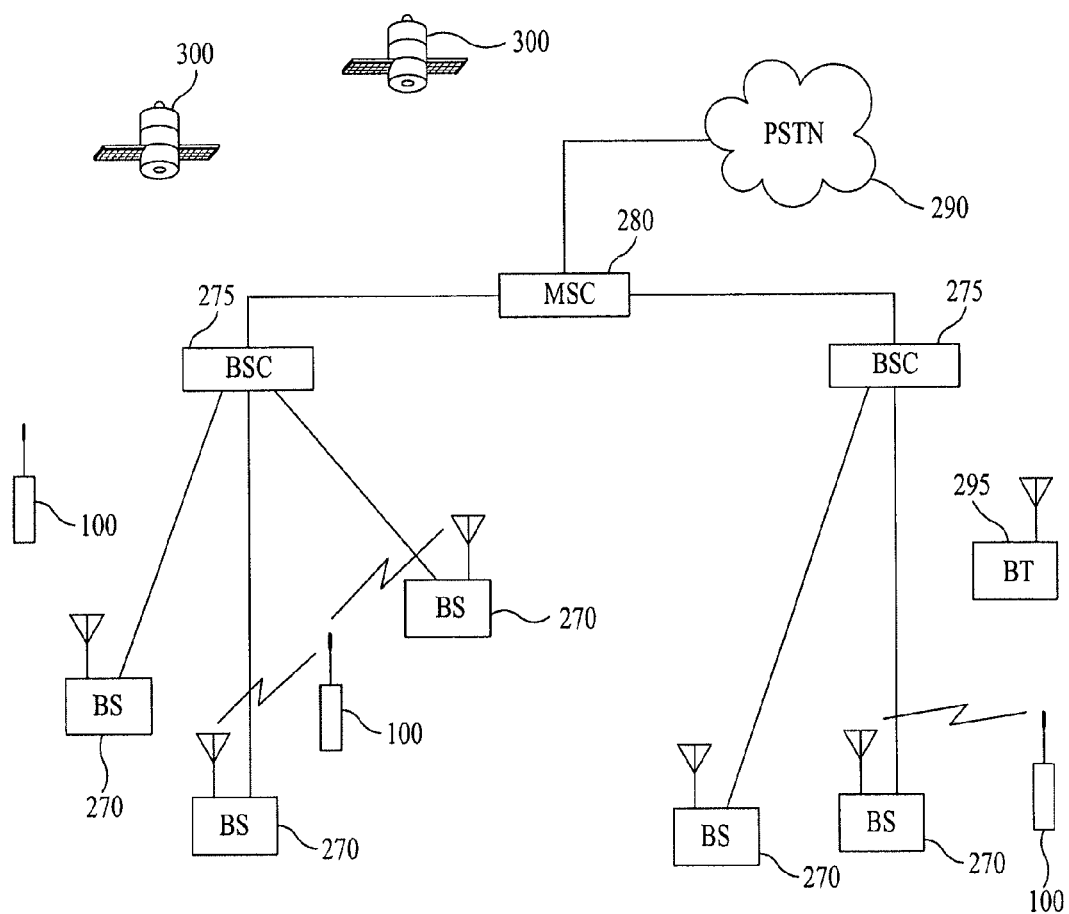
FIG. 4 is a block diagram of a wireless communication system in which a mobile terminal according to an embodiment of the present invention is operable.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen. Further, the touch screen or its screen will be indicated by the reference number '400'.

First Embodiment

The first embodiment of the present invention will now be explained with reference to FIGS. 5 and 6(a) to 6(e). In more detail, FIG. 6(a) illustrates a standby-mode image being displayed on a touch screen 400 of the mobile terminal 100.

As shown, first to fourth icons 410 to 404 for functions frequently used in the mobile terminal 100 are displayed on the touch screen 400 in the standby-mode.

In this example, the first icon 401 is to enter a menu mode, the second icon 402 is to enter a call mode, the third icon 403 is to enter a message mode, and the fourth icon 404 is to enter a phonebook mode.

Also, if the second icon 402 is selected from the displayed icons for example, the mobile terminal 100 enters the call mode. Then, as shown in FIG. 6(b), an image for the call mode is displayed on the touch screen 400.

Figure 5:
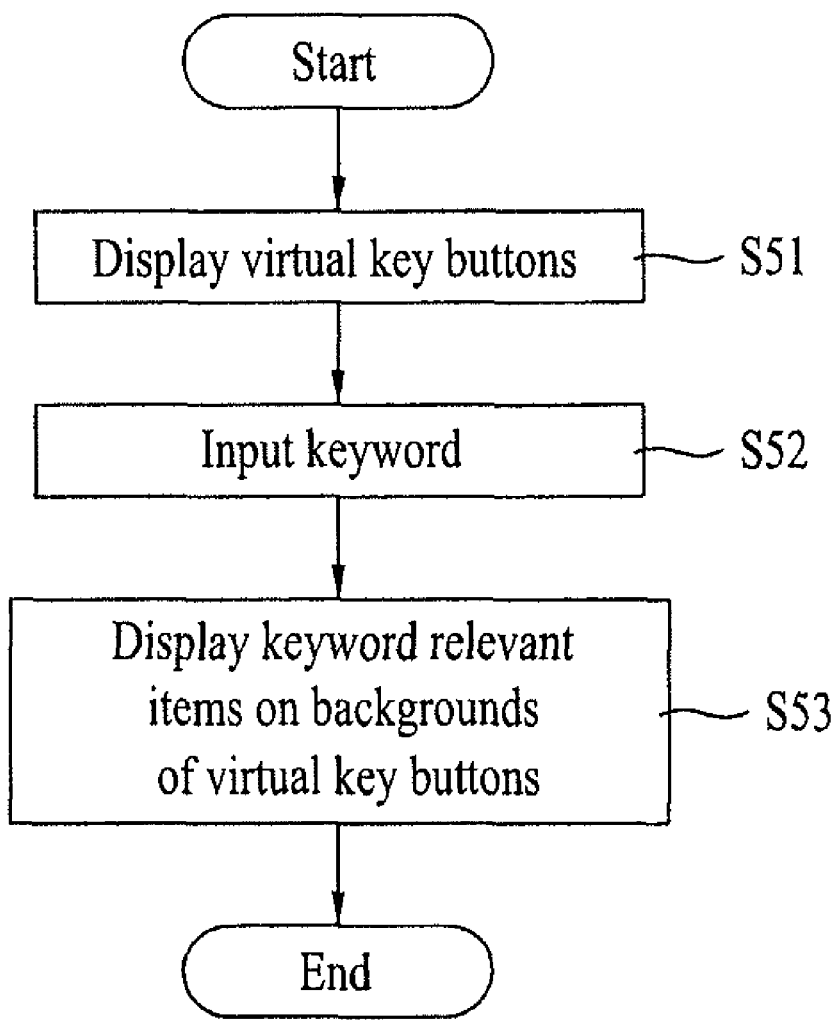
FIG. 5 is a flowchart illustrating a method of controlling a mobile terminal according to an embodiment of the present invention.

In particular, and as shown in FIG. 5, first virtual key buttons 410 for inputting a phone number and second virtual key buttons 420 for connecting a call according to the inputted phone number are displayed on the touch screen 400 (S51). As shown in FIG. 6(b), an identifier (e.g., a digit specifying each of the first key buttons) of a specific key button is displayed on each of the key buttons. In this instance, the identifier of the key button means a digit or a character symbol specifying each of the key buttons.

Then, as shown in FIG. 5, if the first key buttons 410 are briefly touched, digits of a specific phone number (for example, "010 1234 5678") start to be input (S52). In FIG. 6(c), it is assumed that a first portion ("010 12") of the specific phone number is input.

Then, the controller 180 searches the memory 160 for items (i.e., phone numbers) containing the first portion of the specific phone number. As shown in FIG. 6(c), the searched phone numbers (or information relevant to the searched phone numbers) are displayed on backgrounds of the first key buttons 410, respectively (S53). In particular, each of the searched phone numbers (or informations relevant to the searched phone numbers) is displayed to occupy each of the key buttons.

In this instance, the relevant information may include images, names or the like of correspondent parties stored in association with the searched phone numbers. FIG. 6c shows images of the correspondent parties associated with the searched phone numbers. Further, in FIG. 6(c), it is assumed that the number of the phone numbers searched according to the first portion is greater than the number of the first key buttons.

Therefore, in FIG. 6(c), the images of high-priority phone numbers searched as many as the number of the second key buttons are displayed in prescribed reference order (e.g., recent used order, most frequently used order, recently stored order, alphabet order of correspondent name, etc.) among the searched phone numbers.

Referring to FIG. 6(c), when the images are displayed on the backgrounds of the first key buttons, respectively, the identifiers of the first key buttons are displayed by moving the identifiers to one side of the first key buttons such that the user can easily see the identifiers of the first key buttons separately from the images, respectively. Optionally, to discriminate the identifiers from the images, colors (not shown in the drawing) of the identifiers can be displayed as complementary colors for major colors of the first key buttons.

Then, as shown in FIG. 6(d), the user inputs additional numbers of the specific phone number. That is, the additional numbers "34" are added to the first portion ("010 12") of the specific phone number. Thus, the controller 180 searches the memory 160 for all phone numbers corresponding to the input phone number. Note that in this example, the number of phone numbers that match the input phone number is reduced as compared to FIG. 6(c). That is, key buttons that do not have the corresponding image are left blank or can be indicated as not occupied by the corresponding image. In other words, when a second key button of the plurality of virtual key buttons is subsequently touched after the first key button is touched, at least one displayed item disappears from the displayed virtual key buttons.

Then, as shown in FIG. 6(e), when the user selects one of the key buttons of the desired phone number (in this instance the identifier "5" is touched), the controller 180 dials the corresponding phone number.

Figure 7:
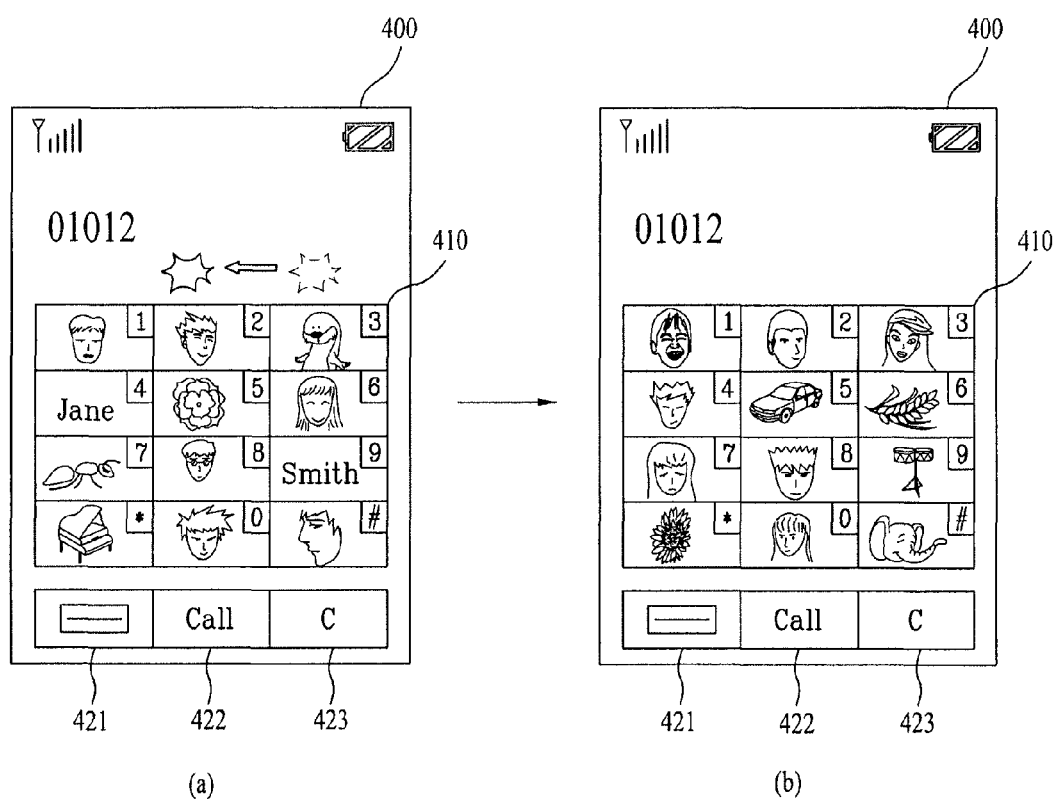
FIGS. 7(a) and 7(b) are overviews illustrating screen shots of a mobile terminal illustrating a scrolling operation being performed according to the first embodiment of the present invention.

First modified example of the above-described first embodiment is explained with reference to FIG. 7.

Next, FIGS. 7(a) and 7(b) are overviews illustrating screen shots of a mobile terminal illustrating a scrolling operation being performed according to the first embodiment of the present invention. In more detail, FIGS. 7(a) to 7(b) illustrating an example in which the number of corresponding telephone numbers is greater than the displayed number of the first key buttons. The identifiers "4" and "9" in FIG. 7(a) also illustrates the name of a person corresponding to the telephone being displayed rather than an image.

As shown in FIG. 7(a), a part of the touch screen 400 is flicked or touch-dragged to perform a scrolling operation. Then, as shown in FIG. 7(b), the controller 180 scrolls the displayed items based on the scrolling amount. The phone numbers can also be displayed based on higher priority phone numbers being displayed first with less important (lower priority) phone numbers being displayed second. Further, the searched phone numbers having the lower priorities can also be displayed when a left key button 421 among the second key buttons 420 is touched.

Figure 8:
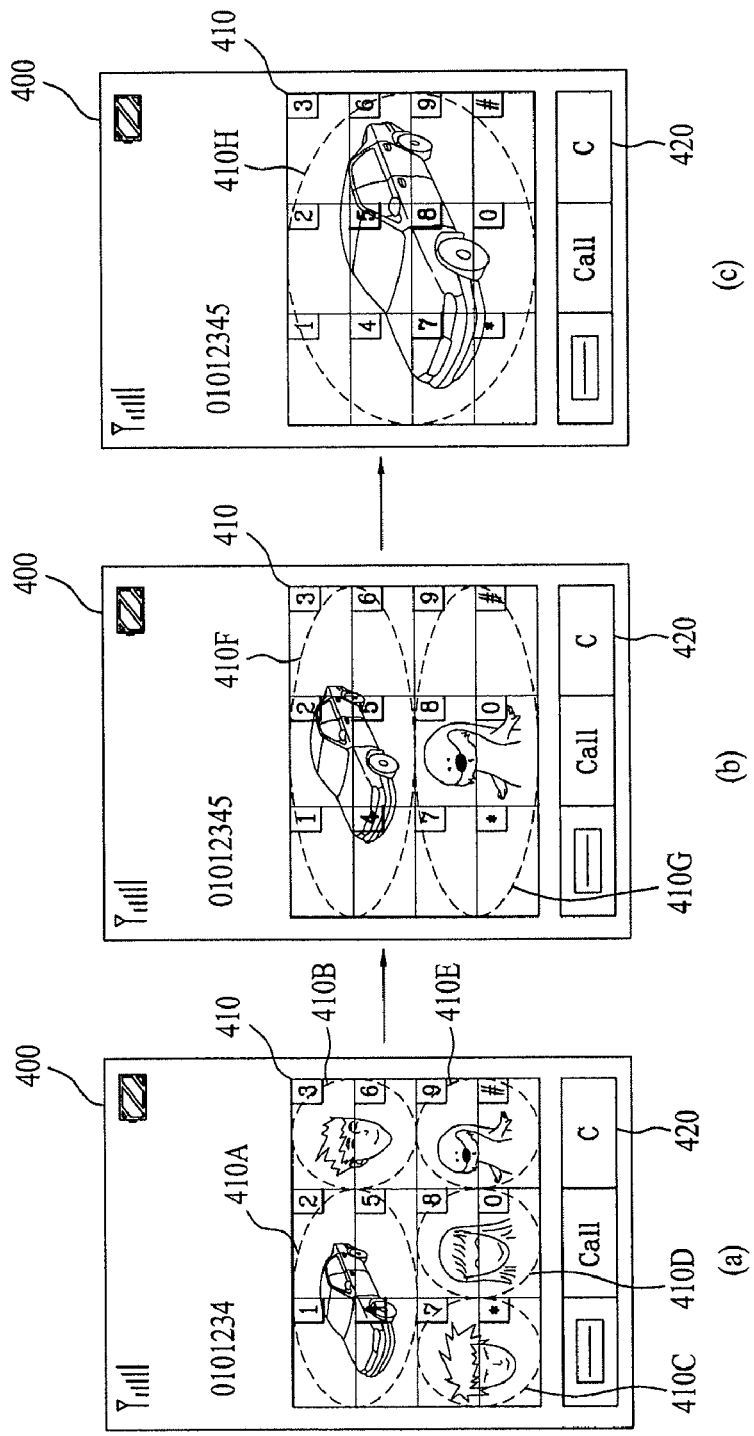
FIGS. 8(a) to 8(c) are overviews illustrating screen shots of a mobile terminal in an image displaying method according to modified example of the first embodiment of the present invention.

FIGS. 8(a) to 8(c) are overviews illustrating screen shots of a mobile terminal in an image displaying method according to modified example of the first embodiment of the present invention. In this modified example, when the items that are relevant to the first touched key button is less in number than a number of key buttons, the control unit displays an item to be larger than a corresponding key button.

In more detail, and as shown in FIG. 8(a), the number of the phone numbers searched according to the specific phone number input so far is smaller than the number of the first key buttons (i.e., the number of phone numbers is "5" and the number of key buttons is 12). In this instance, information corresponding to each of the searched phone numbers is configured to occupy at an are larger than a single key button.

In particular, the first key buttons 410 are divided into groups 410A, 410B, 410C, 410D and 410E amounting to the same number (i.e., 5) of the searched phone numbers. Further, the groups are preferably equally divided but as shown in FIG. 8(a), the groups may not be equally divided, but are equally divided as best as possible (i.e., the lower groups are equally divided and the upper groups are equally divided). Then, when if any key button belonging to the one group is touched for a predetermined amount of time (e.g., a long touch), the controller 180 attempts to call the specific number.

In addition, FIG. 8(b) illustrates an example in which the user enters more the phone number (i.e., the user enters the additional number "5"0. Thus, as shown, the controller 180 displays phone numbers that include the input numbers (which is assumed to be only two phone numbers). Further, and as shown in FIG. 8(b), the first key buttons 410 are divided into two equal groups 410E and 410G, information corresponding to the searched two phone numbers are displayed to occupy the two groups 410E and 410G, respectively.

FIG. 8(c) illustrates the example in which only one search number corresponds to the phone number input so far. As shown, the first key buttons 410 are grouped into a single group 410H, and the information corresponding to the specific phone number is displayed to occupy the one group 410H.

Further, the above descriptions related to the first embodiment are described with respect to the call mode. However, the above features also relate to other modes, such as sending emails, text messages, etc.

Figure 9:
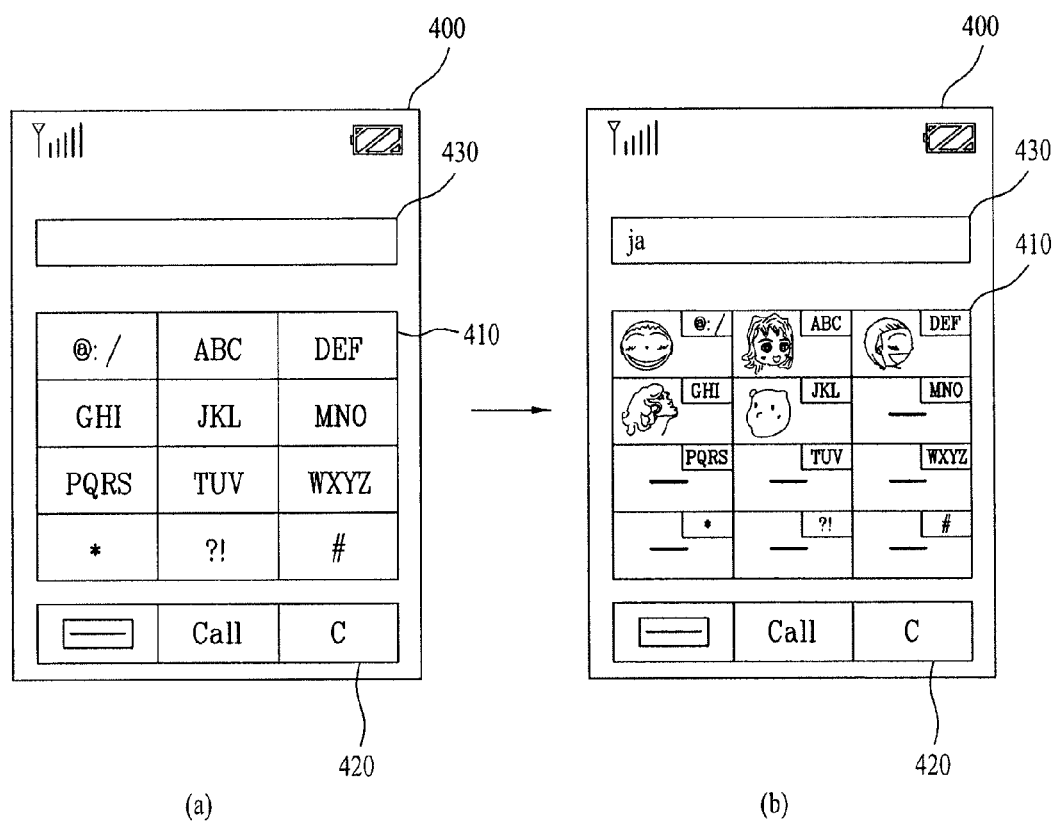
FIGS. 9(a) and 9(b) are overviews illustrating screen shots of a mobile terminal in an image displaying method according to still another modification of the first embodiment of the present invention.

Next, FIGS. 9(a) and 9(b) are overviews illustrating screen shots of a mobile terminal in an image displaying method according to still another modification of the first embodiment of the present invention. In more detail, FIGS. 9(a) and 9(b) illustrate an example in which the fourth icon 404 in FIG. 6(a) is selected in the idle more for entering a phonebook mode. Then, as shown in FIG. 9(a), the controller 180 displays a screen image corresponding to the phonebook mode on the touch screen 400.

That is, the controller 180 displays virtual key buttons for text input instead of virtual key buttons for inputting digits as in FIG. 6(b). In particular, the first virtual key buttons 410 are used for text input and the second virtual key button 420 is used for search phone names or other entries having the characters input into a text input window 430.

As shown in FIG. 9(b), the user has entered the characters "ja" for the name "Jane", for example, and the controller 180 displays images corresponding to names of people that have the characters "ja" in their names on the first key buttons 410 (note that the number of searched names, for example, is less than the number of first key buttons such that some of the first key buttons are left blank). The images may also be displayed as shown in the embodiment of FIGS. 8(a) to 8(c).

Further, the present invention is also applicable to other modes besides the calling mode and phonebook described above with respect to the first embodiments. For example, the present invention is also applicable to searching for multimedia file names, e-mail addresses, etc. Further, the searched items are displayed on backgrounds of the first key buttons 410, but can be displayed in other portions of the display such as on backgrounds of the second key buttons 420.

Second Embodiment

Figure 10:
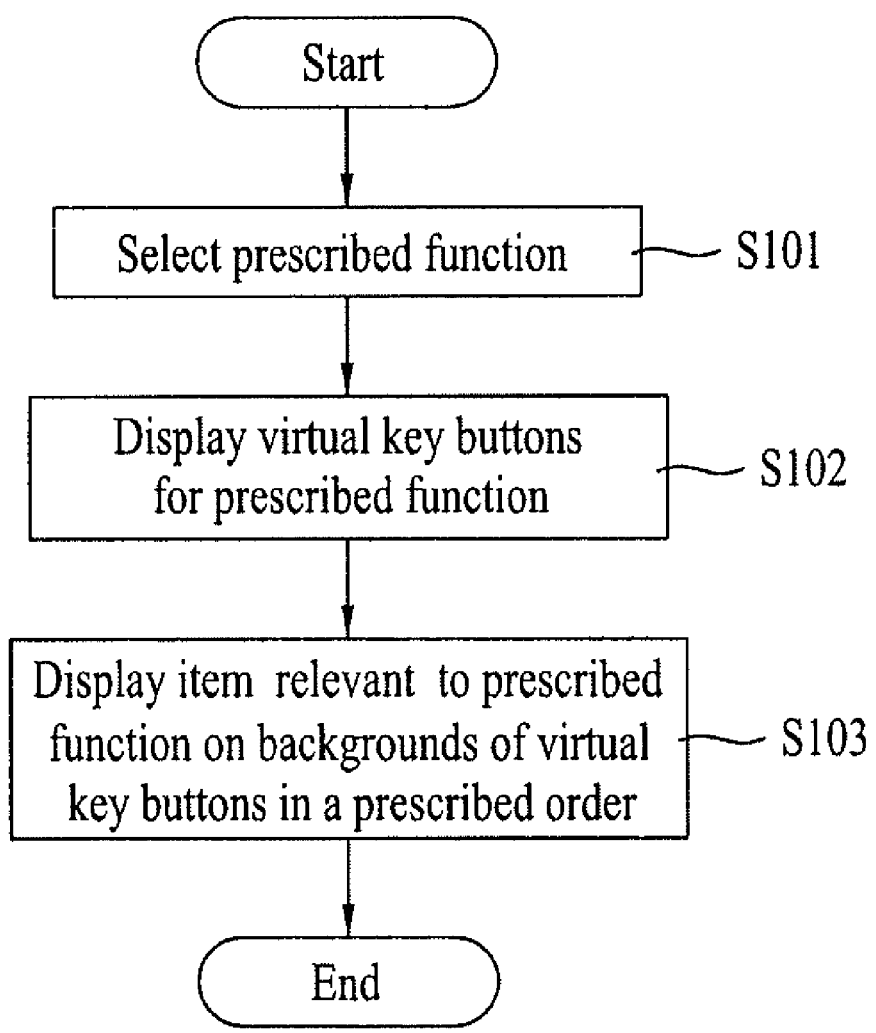
FIG. 10 is a flowchart for a method for controlling a mobile terminal according to a second embodiment of the present invention.

The second embodiment of the present invention will now be explained with reference to FIGS. 10 and 11(a) to 11(c). In more detail, FIG. 10 is a flowchart and FIGS. 11(a) to 11(c) are overviews illustrating screen shots of a mobile terminal for explaining a method for controlling a mobile terminal according to the second embodiment of the present invention.

As shown in FIG. 11(a), the controller 180 displays a standby mode on the touch screen 400 of the mobile terminal 100 similar to that as shown in FIG. 6(a). Referring to FIG. 10, when the user selects the second icon 402, the controller 180 enters the mobile terminal 100 into a call mode (S101). Then, as shown in FIG. 11(b), the controller 180 displays the screen for the call mode on the touch screen 400.

In particular, as mentioned in the foregoing description of the first embodiment of the present invention, the first virtual key buttons 410 for inputting a phone number and second virtual key buttons 420 for a call connection according to the inputted phone number are displayed on the touch screen (S102).

Figure 6:
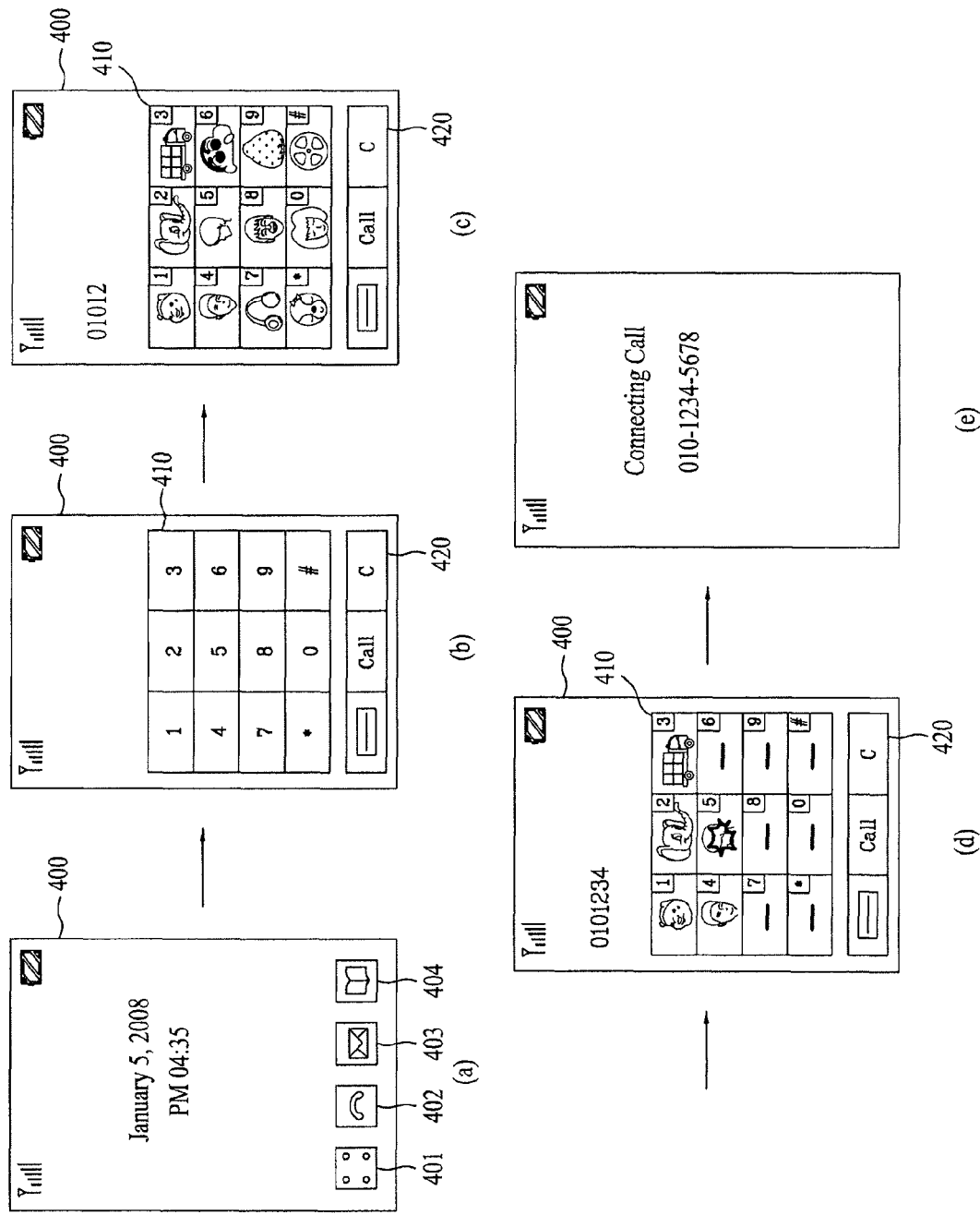
FIGS. 6(a) to 6(e) are overviews illustrating screen shots of a mobile terminal in an image displaying method according to a first embodiment of the present invention.
Figure 11:
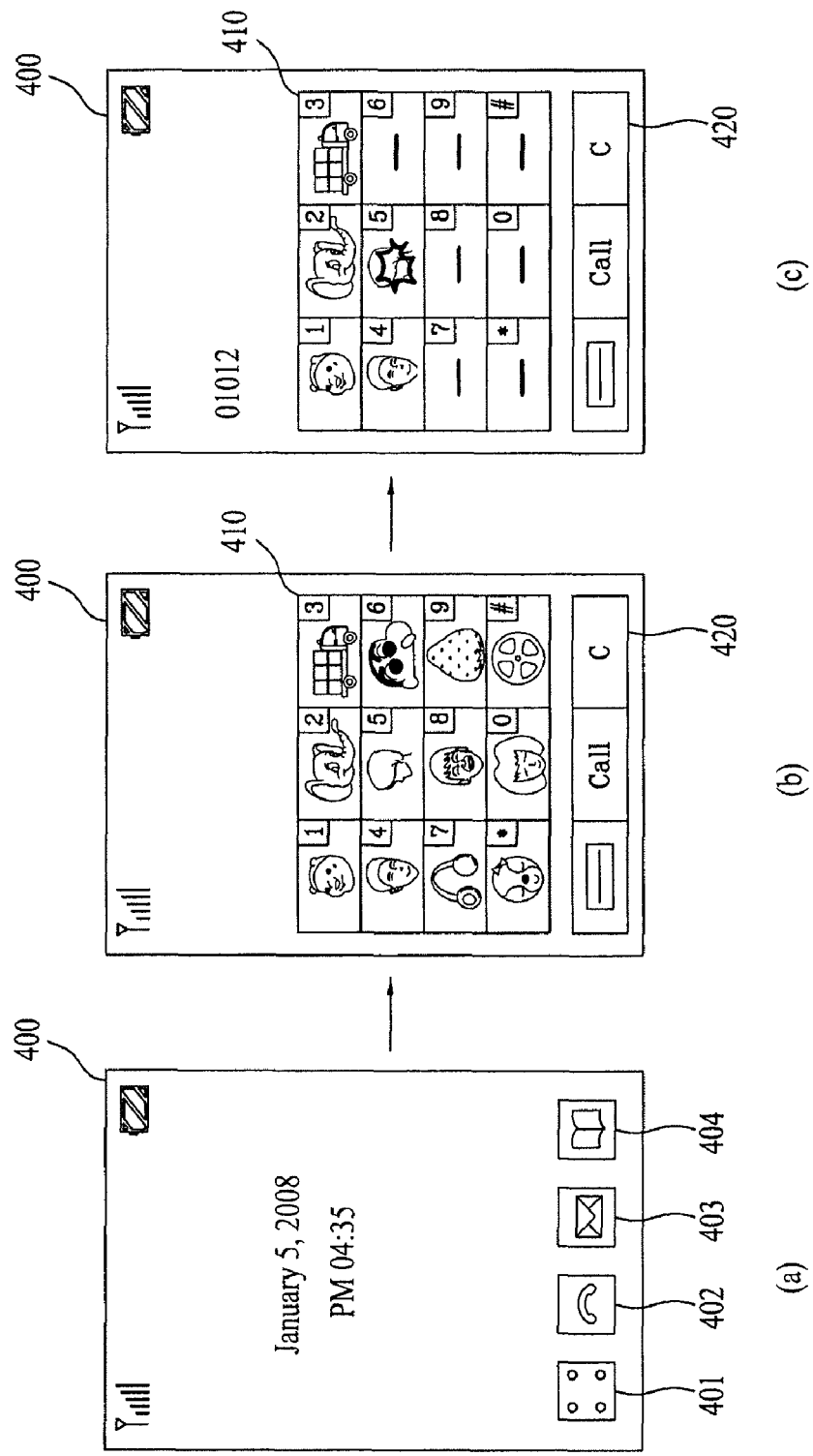
FIGS. 11(a) to 11(c) are overviews illustrating screen shots of a mobile terminal in an image displaying method according to the second embodiment of the present invention.

Note that FIG. 11 differs from FIG. 6 in that FIG. 6(b) is skipped. That is, in the second embodiment of the present invention, before a specific phone number is inputted via the first key buttons 410, information about phone numbers stored in the memory 160 are displayed on backgrounds of the first key buttons 410 according to prescribed reference order (e.g., recent used order, most frequently used order, recently stored order, consonant and vowel order of correspondent name, etc.) (S103).

Then, as shown in FIG. 11(c), when the user begins inputting numbers (e.g., "01012") via the first key buttons 410, the controller 180 searches the memory 160 for items (i.e., phone numbers) containing the portion of the specific phone number.

Subsequently, the controller 180 displays the information relevant to the searched phone numbers on the backgrounds of the first key buttons 410 according to the prescribed reference order, respectively. Note that rather than phone numbers, the second embodiment can also be applied to emails, music files, movies, phonebook lists, etc. as in the first embodiment.

Further, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

Accordingly, the present invention provides several advantage. For example, embodiments of the present invention makes is easier for a user to search various and numerous items stored in a terminal for a specific item, thereby enabling a corresponding function to be executed. The amount of information is efficiently displayed making it easier for user to operate the terminal.

It will be apparent to those skilled in the art that various modifications and variations can be made in the present invention without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal. Thus, it is intended that the present invention covers the modifications and variations of this invention provided they come within the scope of the appended claims and their equivalents.

What is claimed is:

1. A mobile terminal, comprising:
a display including a touch screen; and
a control unit configured to display on the touch screen a plurality of virtual key buttons, and when a first key button of the plurality of virtual key buttons is touched, to display at least one item that is relevant to the first touched key button in the displayed virtual key buttons,
wherein when a second key button of the plurality of virtual key buttons is subsequently touched after the first key button is touched, at least one of the displayed at least one item disappears from the displayed virtual key buttons, and
wherein the control unit is further configured to determine a number of items that is relevant to both the first and second key buttons when the second key button is touched, and to display the determined number of items that is relevant on the displayed virtual key buttons.

2. The mobile terminal of claim 1, wherein the displayed at least one item that is relevant to the first touched key button is displayed in a background or foreground area of the displayed virtual key buttons.

3. The mobile terminal of claim 1, wherein the control unit is further configured to render an identifier of the virtual key button to be displayed at a side of a corresponding virtual key button.

4. The mobile terminal of claim 1, wherein the plurality of virtual key buttons are numbers or characters, and the items that are relevant to the touched key button are contacts or files stored in the mobile terminal.

5. The mobile terminal of claim 1, wherein the determined number of items that is relevant to both the first and second key buttons is the same as or less than a number of items that is relevant to only the first key button.

6. The mobile terminal of claim 1, wherein when a displayed item is touched, the control unit is further configured to execute a contact or filename corresponding to the touched item.

7. The mobile terminal of claim 1, wherein the control unit is further configured to scroll through the items that are relevant based on a touch and drag operation performed on the touch screen.

8. A mobile terminal comprising:
a display including a touch screen; and
a control unit configured to display on the touch screen a plurality of virtual key buttons, and when a first key button of the plurality of virtual key buttons is touched, to display at least one item that is relevant to the first touched key button in the displayed virtual key buttons,
wherein when the at least one item that is relevant to the first touched key button is less in number than a number of key buttons, the control unit is further configured to display the at least one item to be larger than a corresponding key button.

9. A mobile terminal comprising:
a display unit including a touch screen; and
a control unit configured to display a plurality of virtual key buttons when a prescribed function is selected, and to display items relevant to the prescribed function in the displayed virtual key buttons,
wherein when a first key button of the plurality of virtual key buttons is touched, at least one item that is relevant to the first touched key button is displayed in the displayed virtual key buttons,
wherein when a second key button of the plurality of virtual key buttons is subsequently touched after the first key button is touched, at least one of the displayed at least one item disappears from the displayed virtual key buttons, and
wherein the control unit is further configured to determine a number of items that is relevant to both the first and second key buttons when the second key button is touched, and to display the determined number of items that is relevant on the displayed virtual key buttons.

10. The mobile terminal of claim 9, wherein the at least one item relevant to the prescribed function is displayed in a background or foreground area of the displayed virtual key buttons, and
wherein the control unit is further configured to render an identifier of the virtual key button to be displayed at a side of a corresponding virtual key button.

11. The mobile terminal of claim 9, wherein the plurality of virtual key buttons are numbers or characters, and the items that are relevant to the touched key button are contacts or files stored in the mobile terminal.

12. The mobile terminal of claim 9, wherein the determined number of items that is relevant to both the first and second key buttons is the same as or less than a number of items that is relevant to only the first key button.

13. The mobile terminal of claim 9, wherein when a displayed item is touched, the control unit is further configured to execute a contact or filename corresponding to the touched item.

14. A mobile terminal comprising:
a display unit including a touch screen; and
a control unit configured to display a plurality of virtual key buttons when a prescribed function is selected, and to display items relevant to the prescribed function in the displayed virtual key buttons,
wherein when the at least one item that is relevant to the touched key button is less in number than a number of key buttons, the control unit is further configured to display the at least one item to be larger than a corresponding key button.

15. A method of controlling a mobile terminal, the method comprising:
displaying on a touch screen of the mobile terminal a plurality of virtual key buttons; and
displaying at least one item that is relevant to a first touched key button in the displayed virtual key buttons, when the first key button of the plurality of key buttons is touched,
wherein when a second key button of the plurality of virtual key buttons is subsequently touched after the first key button is touched, at least one of the displayed at least one item disappears from the displayed virtual key buttons, and
wherein the method further comprises:
determining a number of items that is relevant to both the first and second key buttons when the second key button is touched; and
displaying the determined number of items that is relevant on the displayed virtual key buttons.

16. The method of claim 15, wherein the displayed at least one item relevant to the first touched key button is displayed in a background or foreground area of the displayed virtual key buttons.

17. The method of claim 15, further comprising:
displaying an identifier of the virtual key button at a side of a corresponding virtual key button.

18. The method of claim 15, wherein the plurality of virtual key buttons are numbers or characters, and the items that are relevant to the touched key button are contacts or files stored in the mobile terminal.

19. The method of claim 15, wherein the determined number of items that is relevant to both the first and second key buttons is the same as or less than a number of items that is relevant to only the first key button.

20. The method of claim 15, wherein when a displayed item is touched, the method further comprising executing a contact or filename corresponding to the touched item.

21. A method of controlling a mobile terminal, the method comprising:
displaying on a touch screen of the mobile terminal a plurality of virtual key buttons; and
displaying at least one item that is relevant to the first touched key button in the displayed virtual key buttons, when a first key button of the plurality of key buttons is touched,
wherein when the at least one item that is relevant to the first touched key button is less in number than a number of key buttons, the method further comprises displaying the at least one item to be larger than a corresponding key button.

22. A method of controlling a mobile terminal, the method comprising:
displaying a plurality of virtual key buttons on a touch screen of the mobile terminal when a prescribed function is selected; and
displaying items relevant to the prescribed function in the displayed virtual key buttons,
wherein when a first key button of the plurality of virtual key buttons is touched, at least one item that is relevant to the first touched key button is displayed in the displayed virtual key buttons,
wherein when a second key button of the plurality of virtual key buttons is subsequently touched after the first key button is touched, at least one of the displayed at least one item disappears from the displayed virtual key buttons, and
wherein the method further comprises:
determining a number of items that is relevant to both the first and second key buttons when the second key button is touched; and
displaying the determined number of items that is relevant on the displayed virtual key buttons.

23. The method of claim 22, wherein the at least one item relevant to the prescribed function is displayed in a background or foreground area of the displayed virtual key buttons.

* * * * *